(12) United States Patent
Taniguchi et al.

(10) Patent No.: US 11,498,150 B2
(45) Date of Patent: Nov. 15, 2022

(54) RESISTANCE SPOT WELDING METHOD

(71) Applicant: JFE STEEL CORPORATION, Tokyo (JP)

(72) Inventors: Koichi Taniguchi, Tokyo (JP); Reiko Endo, Tokyo (JP); Katsutoshi Takashima, Tokyo (JP); Hiroshi Matsuda, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 333 days.

(21) Appl. No.: 16/645,789

(22) PCT Filed: Aug. 14, 2018

(86) PCT No.: PCT/JP2018/030309
§ 371 (c)(1),
(2) Date: Mar. 10, 2020

(87) PCT Pub. No.: WO2019/054116
PCT Pub. Date: Mar. 21, 2019

(65) Prior Publication Data
US 2020/0269342 A1  Aug. 27, 2020

(30) Foreign Application Priority Data
Sep. 13, 2017 (JP) .............................. JP2017-175983

(51) Int. Cl.
*B23K 11/16* (2006.01)
*B23K 103/08* (2006.01)
(Continued)

(52) U.S. Cl.
CPC ............. *B23K 11/16* (2013.01); *B23K 11/115* (2013.01); *B23K 2103/04* (2018.08); *B23K 2103/15* (2018.08)

(58) Field of Classification Search
CPC ... B23K 11/115; B23K 11/16; B23K 2103/04; B23K 2103/15
See application file for complete search history.

(56) References Cited

U.S. PATENT DOCUMENTS 8,962,149 B2   2/2015  Oikawa et al.
9,475,147 B2  10/2016  Taniguchi et al.
(Continued)

FOREIGN PATENT DOCUMENTS

CN  102625740 A  8/2012
CN  103889634 A  6/2014
(Continued)

OTHER PUBLICATIONS

Mar. 24, 2021, Office Action issued by the China National Intellectual Property Administration in the corresponding Chinese Patent Application No. 201880059005.8 with English language search report.

(Continued)

Primary Examiner — Brian W Jennison
Assistant Examiner — Abigail H Rhue
(74) Attorney, Agent, or Firm — Kenja IP Law PC

(57) ABSTRACT

Main current passage and subsequent current passage are performed, with a cooling time of 0.01 s or more being provided between the main current passage and the subsequent current passage. Ip/I which is a ratio of a current value of the subsequent current passage to a current value of the main current passage is controlled to satisfy a predetermined relationship depending on a constant A defined by Mn content and P content of a steel sheet as a part to be welded, in relation to a welding time Tp of the subsequent current passage, a cooling time T, and the constant A.

1 Claim, 3 Drawing Sheets

(51) Int. Cl.
    *B23K 103/04*     (2006.01)
    *B23K 11/11*      (2006.01)

(56)         References Cited

U.S. PATENT DOCUMENTS 10,081,073  B2    9/2018   Watanabe et al.
    10,641,304  B2    5/2020   Taniguchi et al.
    2012/0141829 A1   6/2012   Oikawa et al.
    2016/0082543 A1*  3/2016   Wakabayashi ......... B23K 11/16
                                                          219/86.31

FOREIGN PATENT DOCUMENTS

CN          105263663 B    7/2017

JP          S583792   A    1/1983
    JP          S583793   A    1/1983
    JP          2016068142 A   5/2016
    WO          2013161937 A1  10/2013
    WO          2014196499 A1  12/2014
    WO          2016139951 A1  9/2016

OTHER PUBLICATIONS

Mar. 1, 2021, the Extended European Search Report issued by the European Patent Office in the corresponding European Patent Application No. 18856855.4.

Oct. 30, 2018, International Search Report issued in the International Patent Application No. PCT/JP2018/030309.

* cited by examiner

RESISTANCE SPOT WELDING METHOD

TECHNICAL FIELD

The present disclosure relates to a resistance spot welding method.

BACKGROUND

As illustrated in FIG. 1, resistance spot welding is a technique whereby a sheet combination (parts to be welded) 3 of two or more overlapping steel sheets (a two-sheet combination of a lower steel sheet 1 and an upper steel sheet 2 in the drawing) is squeezed by a pair of upper and lower electrodes (a lower electrode 4 and an upper electrode 5) and, while applying an electrode force, a current is passed to melt a contact portion and form a nugget 6 of a required size, thus obtaining a weld joint. In the drawing, t is the thickness of the sheet combination 3.

The quality of the weld joint obtained in this way is evaluated based on nugget diameter and penetration, shear tensile strength (strength when a tensile test is performed in the shearing direction of the joint), cross tension strength (strength when a tensile test is performed in the peeling direction of the joint), fatigue strength, etc. In particular, static strengths such as shear tensile strength and cross tension strength are very important as indices of joint quality.

Of the static strengths, the shear tensile strength tends to increase with an increase in the tensile strength of the base steel sheet. Meanwhile, the cross tension strength tends to hardly increase but rather decrease with an increase in the tensile strength of the base steel sheet.

One reason for this is presumed to be that toughness decreases due to hardening of the nugget and solidification segregation of P and S. Another reason is presumed to be that plastic deformation is suppressed due to hardening of the nugget and the heat-affected zone (HAZ) and as a result opening stress concentrates at the nugget edges.

To solve these problems, for example, JP S58-003792 A (PTL 1) and JP S58-003793 A (PTL 2) each disclose a resistance spot welding method of, after performing main current passage to form a nugget, further performing current passage (subsequent current passage) to soften the nugget.

JPWO 2013-161937 A1 (PTL 3) discloses a welding method of, after performing current passage in spot welding, solidifying the nugget edges and then passing a current through the nugget under predetermined conditions to heat the nugget, in order to suppress segregation of embrittlement elements such as P and S at the nugget edges.

CITATION LIST

Patent Literatures

PTL 1: JP S58-003792 A
PTL 2: JP S58-003793 A
PTL 3: JPWO 2013-161937 A1

SUMMARY

Technical Problem

In recent years, studies have been made to use steel sheets containing a larger amount of Mn than before, in response to demand for stronger and thinner automotive parts.

With the welding methods disclosed in PTL 1 to PTL 3, however, when a steel sheet containing a large amount of Mn is used as a part to be welded, favorable fracture form may not be obtained in a cross tensile test. The welding methods need improvement in this point.

It could therefore be helpful to provide a resistance spot welding method that achieves favorable fracture form in a cross tensile test even in the case where a steel sheet containing a large amount of Mn is used as a part to be welded.

Solution to Problem

We conducted intensive studies to achieve the object stated above.

First, we performed resistance spot welding using, as parts to be welded, steel sheets with various Mn contents and P contents, and investigated why favorable fracture form cannot be obtained in the case where a steel sheet containing a large amount of Mn is used as a part to be welded.

We consequently learned that, not only with steel sheets having high P content but also with steel sheets having high Mn content, brittle interface failure occurs at the nugget in the cross tensile test. As a result of closely looking into why an increase in the Mn content causes interface failure, we learned that there are synergistic effects of condensation of Mn resulting from solidification after welding, formation of a brittle portion associated with the condensation of Mn, and promotion of the influence of segregation of P (P is an embrittlement element) by an increase in Mn content.

We further conducted studies to prevent such interface failure, and discovered that, by performing main current passage and subsequent current passage with a cooling time of at least predetermined duration between the main current passage and the subsequent current passage and appropriately controlling the ratio of the current value of the subsequent current passage to the current value of the main current passage depending on the welding time of the subsequent current passage, the cooling time, and the Mn content and the P content of a steel sheet as a part to be welded, formation of a brittle portion at the nugget edges can be suppressed to prevent brittle interface failure even in the case where a steel sheet containing a large amount of Mn is used as a part to be welded.

The present disclosure is based on these discoveries and further studies.

We thus provide:

1. A resistance spot welding method of joining parts to be welded that are two or more overlapping steel sheets, wherein a steel sheet whose Mn content is highest of the overlapping steel sheets has a chemical composition that satisfies $0.050\% \leq C \leq 0.250\%$,
$3.50\% \leq Mn \leq 12.00\%$,
$0.001\% \leq Si \leq 2.000\%$,
$0.001\% \leq P \leq 0.025\%$, and
$0.0001\% \leq S \leq 0.0020\%$, the resistance spot welding method comprises performing main current passage and subsequent current passage, with a cooling time of 0.01 s or more being provided between the main current passage and the subsequent current passage, and Ip/I which is a ratio of a current value of the subsequent current passage to a current value of the main current passage satisfies, depending on a constant A defined by the Mn content and P content in the chemical composition, any of the following Formulas (1) to (3) in relation to Tp, T, and the constant A:

when A≤0.04, $$(0.41+A)\times(1+T)/(1+Tp) \leq Ip/I \leq (2.04-A)\times(1+T)/(1+Tp) \quad (1);$$

when 0.04<A≤0.09, $$(0.402+1.2\times A)\times(1+T)/(1+Tp) \leq Ip/I \leq (2.08-2\times A)\times(1+T)/(1+Tp) \quad (2); \text{ and}$$

when 0.09<A≤0.155, $$(0.393+1.3\times A)\times(1+T)/(1+Tp) \leq Ip/I \leq (2.17-3\times A)\times(1+T)/(1+Tp) \quad (3),$$

where I denotes the current value of the main current passage expressed in kA, Ip denotes the current value of the subsequent current passage expressed in kA, Tp denotes a welding time of the subsequent current passage expressed in s, T denotes the cooling time expressed in s, and the constant A is defined by any of the following Formulas (4) to (6) depending on the Mn content:

when 3.5%≤Mn≤4.5%, $$A=(Mn+1.5)/200+P \quad (4);$$

when 4.5%<Mn≤7.5%, $$A=(Mn-1.5)/100+P \quad (5); \text{ and}$$

when 7.5%<Mn12.0%, $$A=(Mn-3.9)/60+P \quad (6),$$

where Mn and P are respectively the Mn content and the P content in the chemical composition.

Advantageous Effect

It is thus possible to ensure sufficient cross tension strength even in the case where a steel sheet containing a large amount of Mn is used as a part to be welded. This is advantageous in producing stronger and thinner automotive parts.

DETAILED DESCRIPTION

Figure 1:
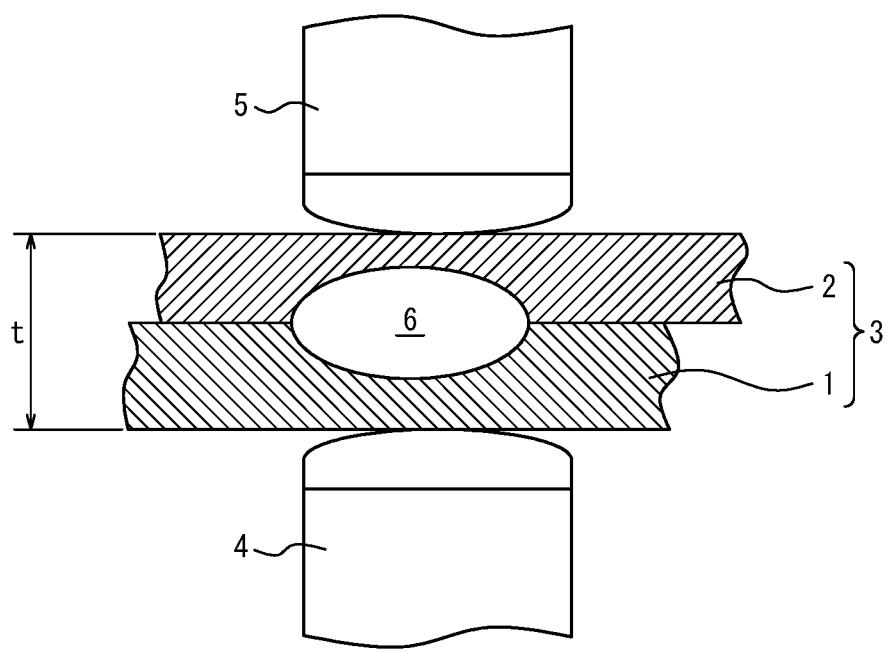
FIG. 1 is a schematic diagram illustrating an example of resistance spot welding.

One of the disclosed embodiments will be described below.

One of the disclosed embodiments is a resistance spot welding method of joining parts to be welded that are two or more overlapping steel sheets, wherein a steel sheet whose Mn content is highest of the overlapping steel sheets has a chemical composition that satisfies 0.050%≤C≤0.250%,
3.50%≤Mn≤12.00%,
0.001%≤Si≤2.000%,
0.001%≤P≤0.025%, and
0.0001%≤S≤0.0020%, the resistance spot welding method comprises performing main current passage and subsequent current passage, with a cooling time of 0.01 s or more being provided between the main current passage and the subsequent current passage, and Ip/I which is a ratio of a current value of the subsequent current passage to a current value of the main current passage satisfies, depending on a constant A defined by a Mn content and P content in the chemical composition, any of the following Formulas (1) to (3) in relation to Tp, T, and the constant A:

when A≤0.04, $$(0.41+A)\times(1+T)/(1+Tp) \leq Ip/I \leq (2.04-A)\times(1+T)/(1+Tp) \quad (1);$$

when 0.04<A≤0.09, $$(0.402+1.2\times A)\times(1+T)/(1+Tp) \leq Ip/I \leq (2.08-2\times A)\times(1+T)/(1+Tp) \quad (2); \text{ and}$$

when 0.09<A≤0.155, $$(0.393+1.3\times A)\times(1+T)/(1+Tp) \leq Ip/I \leq (2.17-3\times A)\times(1+T)/(1+Tp) \quad (3),$$

where I denotes the current value of the main current passage expressed in kA, Ip denotes the current value of the subsequent current passage expressed in kA, Tp denotes a welding time of the subsequent current passage expressed in s, T denotes the cooling time expressed in s, and the constant A is defined by any of the following Formulas (4) to (6) depending on the Mn content:

when 3.5%≤Mn≤4.5%, $$A=(Mn+1.5)/200+P \quad (4);$$

when 4.5%<Mn≤7.5%, $$A=(Mn-1.5)/100+P \quad (5); \text{ and}$$

when 7.5%<Mn≤12.0%, $$A=(Mn-3.9)/60+P \quad (6),$$

where Mn and P are respectively the Mn content and the P content in the chemical composition.

An experiment that led to the derivation of the foregoing Formulas (1) to (3) will be described below.

[Experiment]

Resistance spot welding composed of main current passage and subsequent current passage was performed using sheet combinations of two overlapping steel sheets while varying Mn content and P content, to produce various weld joints. Here, the ratio of the current value of the subsequent current passage to the current value of the main current passage, denoted by Ip/I, was varied. A cooling time of 0.1 s was provided between the main current passage and the subsequent current passage, and the welding time in the main current passage and the welding time in the subsequent current passage were respectively 0.4 s and 0.2 s. The electrode force was constant (3.5 kN).

Each of the obtained joints was subjected to a cross tensile test in accordance with JIS Z 3137 (1999), and evaluated based on the following criteria:

Excellent: the fracture form is plug failure, and the plug diameter is 110% or more of the formed nugget diameter.

Good: the fracture form is plug failure, and the plug diameter is 100% or more and less than 110% of the formed nugget diameter.

Poor: other than those rated as excellent or good (the fracture form is partial plug failure or interface failure).

Figure 2:
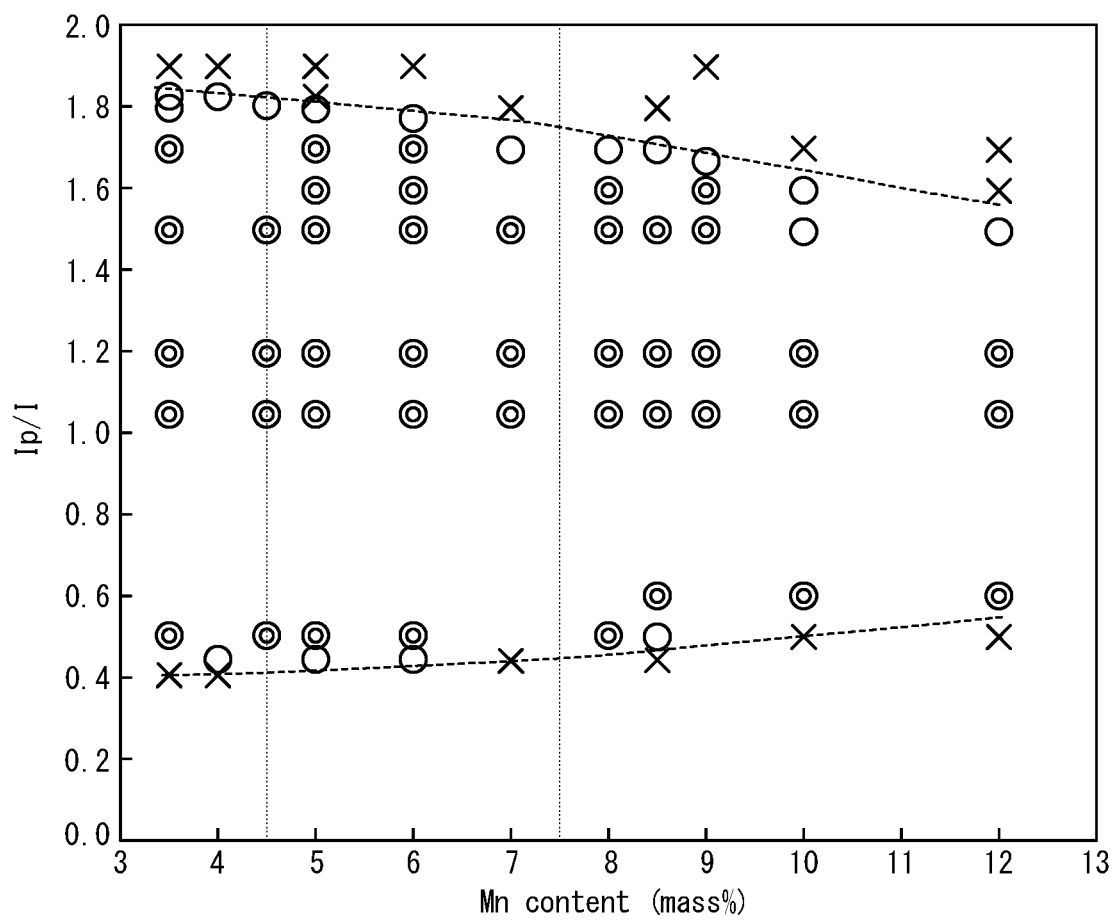
FIG. 2 is a diagram in which cross tension strength evaluation results are plotted with the horizontal axis representing Mn content and the vertical axis representing Ip/I.

FIG. 2 illustrates the evaluation results, with the horizontal axis representing Mn content and the vertical axis representing Ip/I.

As illustrated in FIG. 2, the appropriate range of Ip/I changed depending on the Mn content. Based on the evaluation results, we conducted further studies, and conceived the following idea: Regarding the influence of each of the Mn content and the P content on the nugget embrittlement effect, the influence of Mn is less than the influence of P when the Mn content is in a range of 3.50%≤Mn≤4.50%,
the influence of Mn is greater than the influence of P when the Mn content is in a range of 4.50%<Mn≤7.50%, and
the influence of Mn is particularly greater than the influence of P when the Mn content is in a range of 7.50%<Mn≤12.00%.

Accordingly, by setting a parameter reflecting the influence of Mn and the influence of P and controlling Ip/I based on the parameter for each of these ranges, sufficient cross tension strength is ensured even in the case where a steel sheet containing a large amount of Mn is used as a part to be welded.

Figure 3:
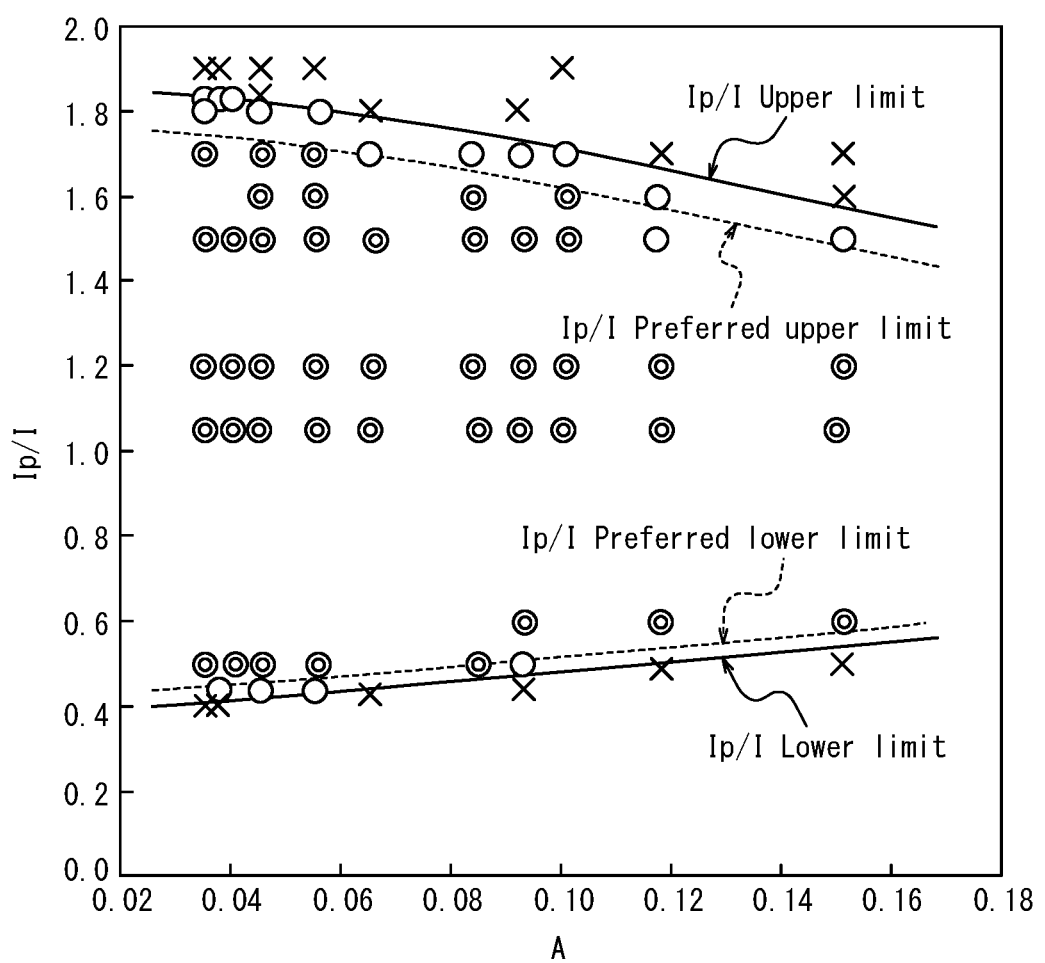
FIG. 3 is a diagram in which cross tension strength evaluation results are plotted with the horizontal axis representing constant A and the vertical axis representing Ip/I.

We further conducted studies based on this idea, and discovered the following:

It is optimal to use, as the parameter reflecting the influence of Mn and the influence of P, a constant A defined by any of the foregoing Formulas (4) to (6) depending on the Mn content.
As illustrated in FIG. 3, by controlling Ip/I to satisfy any of the foregoing Formulas (1) to (3) depending on the constant A, sufficient cross tension strength can be ensured even in the case where a steel sheet containing a large amount of Mn is used as a part to be welded.

FIG. 3 is a diagram in which the evaluation results are plotted with the horizontal axis representing the constant A and the vertical axis representing Ip/I.

The constant A is derived from any of the foregoing Formulas (4) to (6) depending on the Mn content of a steel sheet having the highest Mn content (hereafter also simply referred to as "steel sheet") of the steel sheets constituting the parts to be welded, as described above. The reason why the method of deriving the constant A needs to be changed depending on the Mn content of the steel sheet is presumed as follows.

The constant A is defined by the Mn content and the P content of the steel sheet as indicated in the foregoing Formulas (4) to (6), and technically expresses the influence of each of the Mn content and the P content on the decrease of the toughness of the nugget. Since the influence of P tends to be promoted by an increase in the Mn content as mentioned earlier, the constant A needs to be set so that the influence of Mn relatively increases in association with an increase in the Mn content. Hence, the method of deriving the constant A needs to be changed depending on the Mn content of the steel sheet.

The reason why the constant A is set based on the steel sheet having the highest Mn content of the steel sheets constituting the parts to be welded is that the composition of the nugget is influenced by the steel sheet having the highest Mn content.

When A≤0.04, the influence of P on the decrease of the toughness of the nugget is limited, and the decrease of the toughness of the nugget can be suppressed even if the current value of the subsequent current passage, in other words, Ip/I which is the ratio of the current value of the subsequent current passage to the current value of the main current passage, is not increased significantly in relation to the constant A. If the current value of the subsequent current passage is excessively large, expulsion (splash) occurs. In view of this, when A≤0.04, the foregoing Formula (1) is to be satisfied.

The lower limit of the foregoing Formula (1) is preferably $(0.45+A)\times(1+T)/(1+Tp)$, and more preferably $(0.49+A)\times(1+T)/(1+Tp)$. The upper limit of the foregoing Formula (1) is preferably $(1.94-A)\times(1+T)/(1+Tp)$, and more preferably $(1.84-A)\times(1+T)/(1+Tp)$.

When 0.04<A≤0.09, the influence of segregation of P on the decrease of the toughness of the nugget is great, and the decrease of the toughness of the nugget caused by segregation of P cannot be suppressed unless the current value of the subsequent current passage, in other words, Ip/I which is the ratio of the current value of the subsequent current passage to the current value of the main current passage, is increased to a certain extent in relation to the constant A. Meanwhile, when 0.04<A≤0.09, the Mn content increases, so that the melting point of the nugget decreases with segregation of P. If the nugget remelts as a result of the subsequent current passage, the toughness improving effect by the subsequent current passage cannot be achieved. Therefore, the current value of the subsequent current passage needs to be limited to a predetermined value or less. In view of this, when 0.04<A≤0.09, the foregoing Formula (2) is to be satisfied.

The lower limit of the foregoing Formula (2) is preferably $(0.442+1.2\times A)\times(1+T)/(1+Tp)$, and more preferably $(0.482+1.2\times A)\times(1+T)/(1+Tp)$. The upper limit of the foregoing Formula (2) is preferably $(1.98-2\times A)\times(1+T)/(1+Tp)$, and more preferably $(1.88-2\times A)\times(1+T)/(1+Tp)$.

When 0.09<A≤0.155, the influence of segregation of P on the decrease of the toughness of the nugget is greater, and the current value of the subsequent current passage, in other words, Ip/I which is the ratio of the current value of the subsequent current passage to the current value of the main current passage, needs to be further increased in relation to the constant A. Meanwhile, in terms of achieving the toughness improving effect by the subsequent current passage, the current value of the subsequent current passage needs to be further reduced. In view of this, when 0.09<A≤0.155, the foregoing Formula (3) is to be satisfied.

The lower limit of the foregoing Formula (3) is preferably $(0.433+1.3\times A)\times(1+T)/(1+Tp)$, and more preferably $(0.473+1.3\times A)\times(1+T)/(1+Tp)$. The upper limit of the foregoing Formula (3) is preferably $(2.07-3\times A)\times(1+T)/(1+Tp)$, and more preferably $(1.97-3\times A)\times(1+T)/(1+Tp)$.

In terms of suppressing segregation of P, a cooling time of 0.01 s (seconds) or more (preferably 0.04 s to 0.5 s) needs to be provided between the main current passage and the subsequent current passage. If the cooling time is long, however, the nugget temperature at the start of the subsequent current passage decreases. Hence, the welding conditions of the subsequent current passage need to be adjusted depending on the cooling time, and the relationship of T and Tp needs to be incorporated in the foregoing Formulas (1) to (3).

The technical significance of satisfying any of the foregoing Formulas (1) to (3) depending on the constant A defined by any of the foregoing Formulas (4) to (6) in the resistance spot welding method according to one of the disclosed embodiments has been described above. The welding conditions other than the above are not limited, and may be set according to conventional methods.

For example, the welding time of the main current passage and the welding time of the subsequent current passage are preferably 0.2 s to 1.5 s and 0.04 s to 1.0 s, respectively.

Moreover, both the main current passage and the subsequent current passage are preferably performed by constant current control, and the current value is preferably selected in a range of 4.0 kA to 15.0 kA. The electrode force is preferably 2.0 kN to 7.0 kN. The main current passage and the subsequent current passage may use the same electrode force or different electrode forces.

In the case where welding is difficult as, for example, expulsion occurs in the main current passage, preliminary current passage may be performed before the main current passage, or upslope current passage in which current is gradually increased may be performed. The main current passage may be performed in two or more steps with a welding interval for cooling being provided therebetween, or the main current passage may be made up of multiple steps that vary in the current value during the current passage. In these cases, the current value of the subsequent current passage is determined using, as the current value of the main current passage, the current value of current passage that plays a prominent role in nugget formation.

To achieve the effect by the subsequent current passage more favorably, the combination of the welding interval and the subsequent current passage after the main current passage may be repeatedly performed a plurality of times. If the number of repetitions is excessively large, however, the welding time increases and the construction workability decreases. Accordingly, the number of repetitions is desirably 9 or less.

Any welding device that includes a pair of upper and lower electrodes and is capable of freely controlling each of the electrode force and the welding current during welding may be used in the resistance spot welding method according to one of the disclosed embodiments. The force mechanism (air cylinder, servomotor, etc.), the type (stationary, robot gun, etc.), the electrode shape, and the like are not limited.

Regarding the steel sheets as the parts to be welded, as long as the chemical composition of the steel sheet having the highest Mn content satisfies 0.050%≤C≤0.250%, 3.50%≤Mn≤12.00%, 0.001%≤Si≤2.000%, 0.001%≤P≤0.025%, and 0.0001%≤S≤0.0020%, the resistance spot welding method according to one of the disclosed embodiments can be used effectively. The Mn content is preferably 4.50% or more, more preferably 4.80% or more, and further preferably 5.00% or more. The welding method according to one of the disclosed embodiments is more effective in such cases.

The chemical composition may contain, besides the foregoing components, one or more selected from the group consisting of Ti: 0.001% to 0.200%, Al: 0.001% to 0.200%, B: 0.0001% to 0.0020%, and N: 0.0010% to 0.0100%.

The balance other than these components consists of Fe and inevitable impurities.

As along as the chemical composition of the steel sheet having the highest Mn content satisfies the foregoing range, the chemical composition of each steel sheet as the other part(s) to be welded is not limited, and steel sheets having various strengths from mild steel to ultra high tensile strength steel may be used. A plurality of steel sheets having the same chemical composition may be used as steel sheets included in the sheet combination.

The thickness of each steel sheet is not limited, and is preferably 0.8 mm to 2.3 mm. The thickness of the sheet combination is not limited, and is preferably 1.6 mm to 6.0 mm.

The resistance spot welding method according to one of the disclosed embodiments may also be used for a sheet combination of three or more overlapping steel sheets.

EXAMPLES

For each sheet combination of two or three overlapping steel sheets listed in Table 2 using steel sheets having chemical compositions listed in Table 1, resistance spot welding was performed under the conditions listed in Table 2 to produce a weld joint.

The balance other than the components in Table 1 consists of Fe and inevitable impurities.

An inverter DC resistance spot welder was used as the welder, and chromium copper electrodes with 6 mm face diameter DR-shaped tips were used as the electrodes.

Each of the obtained weld joints was subjected to a cross tensile test in accordance with JIS Z 3137 (1999), and evaluated based on the following criteria:

Excellent: the fracture form is plug failure, and the plug diameter is 110% or more of the formed nugget diameter.

Good: the fracture form is plug failure, and the plug diameter is 100% or more and less than 110% of the formed nugget diameter.

Poor: other than those rated as excellent or good (the fracture form is partial plug failure or interface failure).

The evaluation results are listed in Table 2.

TABLE 1

| Steel sheet No. | Thickness (mm) | C content (mass %) | Mn content (mass %) | Si content (mass %) | P content (mass %) | S content (mass %) | Al content (mass %) | N content (mass %) | Ti content (mass %) | B content (mass %) | Value A | Calculation formula for value A |
|---|---|---|---|---|---|---|---|---|---|---|---|---|
| 1 | 1.2 | 0.146 | 3.53 | 0.247 | 0.020 | 0.0020 | 0.036 | 0.0026 | — | — | 0.0451 | A = (Mn + 1.5)/200 + P |
| 2 | 1.2 | 0.149 | 4.56 | 1.956 | 0.010 | 0.0013 | 0.025 | 0.0025 | — | — | 0.0406 | A = (Mn − 1.5)/100 + P |
| 3 | 2.0 | 0.153 | 5.09 | 0.209 | 0.001 | 0.0020 | 0.022 | 0.0034 | — | 0.0004 | 0.0369 | A = (Mn − 1.5)/100 + P |
| 4 | 1.6 | 0.145 | 5.09 | 0.224 | 0.011 | 0.0007 | 0.025 | 0.0035 | 0.045 | — | 0.0469 | A = (Mn − 1.5)/100 + P |
| 5 | 1.0 | 0.156 | 5.09 | 0.224 | 0.024 | 0.0004 | 0.034 | 0.0029 | — | — | 0.0599 | A = (Mn − 1.5)/100 + P |
| 6 | 1.2 | 0.052 | 5.06 | 0.840 | 0.011 | 0.0020 | 0.036 | 0.0031 | — | — | 0.0466 | A = (Mn − 1.5)/100 + P |
| 7 | 1.2 | 0.247 | 5.02 | 1.413 | 0.002 | 0.0001 | 0.038 | 0.0030 | — | — | 0.0372 | A = (Mn − 1.5)/100 + P |
| 8 | 1.2 | 0.153 | 6.07 | 0.001 | 0.009 | 0.0015 | 0.021 | 0.0024 | — | — | 0.0547 | A = (Mn − 1.5)/100 + P |
| 9 | 1.2 | 0.154 | 11.91 | 0.205 | 0.001 | 0.0001 | 0.020 | 0.0026 | — | — | 0.1345 | A = (Mn − 3.9)/60 + P |
| 10 | 1.2 | 0.160 | 5.07 | 0.242 | 0.028 | 0.0015 | 0.031 | 0.0035 | — | — | 0.0637 | A = (Mn − 1.5)/100 + P |
| 11 | 1.2 | 0.270 | 5.08 | 0.211 | 0.011 | 0.0007 | 0.033 | 0.0030 | — | — | 0.0468 | A = (Mn − 1.5)/100 + P |
| 12 | 1.2 | 0.249 | 8.57 | 0.235 | 0.024 | 0.0016 | 0.030 | 0.0035 | — | — | 0.1018 | A = (Mn − 3.9)/60 + P |
| 13 | 1.2 | 0.200 | 9.87 | 0.241 | 0.022 | 0.0018 | 0.025 | 0.0028 | — | — | 0.1215 | A = (Mn − 3.9)/60 + P |

TABLE 2

| | Sheet combination | | | | | | Main current passage | | | Subsequent current passage |
|---|---|---|---|---|---|---|---|---|---|---|
| No. | Steel sheet 1 (Steel sheet No.) | Steel sheet 2 (Steel sheet No.) | Steel sheet 3 (Steel sheet No.) | Maximum Mn content (mass %) | Constant A | Electrode force (kN) | Current value I (kA) | Welding time (s) | Cooling time T (s) | Current value Ip (kA) |
| 1 | 1 | 1 | — | 3.53 | 0.0451 | 3.5 | 7.0 | 0.28 | 0.20 | 8.0 |
| 2 | 1 | 1 | — | 3.53 | 0.0451 | 3.5 | 7.0 | 0.28 | 0.20 | 10.0 |
| 3 | 1 | 1 | — | 3.53 | 0.0451 | 3.5 | 7.0 | 0.28 | 0.20 | 14.5 |
| 4 | 1 | 1 | — | 3.53 | 0.0451 | 3.5 | 7.0 | 0.28 | 0.20 | 2.5 |
| 5 | 2 | 2 | — | 4.56 | 0.0406 | 4.0 | 7.0 | 0.28 | 0.04 | 7.2 |
| 6 | 2 | 2 | — | 4.56 | 0.0406 | 4.0 | 7.0 | 0.28 | 0.20 | 8.0 |
| 7 | 2 | 2 | — | 4.56 | 0.0406 | 4.0 | 7.0 | 0.28 | 0.20 | 14.0 |
| 8 | 2 | 2 | — | 4.56 | 0.0406 | 4.0 | 7.0 | 0.28 | 0.50 | 8.0 |
| 9 | 2 | 2 | — | 4.56 | 0.0406 | 4.0 | 7.0 | 0.28 | 0.10 | 6.5 |
| 10 | 2 | 2 | — | 4.56 | 0.0406 | 4.0 | 7.0 | 0.28 | 0.10 | 16.0 |
| 11 | 2 | 2 | — | 4.56 | 0.0406 | 4.0 | 7.0 | 0.28 | 0.10 | 1.0 |
| 12 | 2 | 2 | — | 4.56 | 0.0406 | 4.0 | 7.0 | 0.28 | 2.00 | 7.2 |
| 13 | 3 | 3 | — | 5.09 | 0.0369 | 6.5 | 6.8 | 0.28 | 0.20 | 8.0 |
| 14 | 3 | 3 | — | 5.09 | 0.0369 | 6.5 | 6.8 | 0.28 | 0.20 | 10.0 |
| 15 | 3 | 3 | — | 5.09 | 0.0369 | 6.5 | 6.8 | 0.28 | 0.20 | 14.0 |
| 16 | 3 | 3 | — | 5.09 | 0.0369 | 6.5 | 6.8 | 0.28 | 0.20 | 2.5 |
| 17 | 4 | 4 | — | 5.09 | 0.0469 | 4.5 | 7.2 | 0.32 | 0.04 | 7.5 |
| 18 | 4 | 4 | — | 5.09 | 0.0469 | 4.5 | 7.2 | 0.32 | 0.20 | 8.2 |
| 19 | 4 | 4 | — | 5.09 | 0.0469 | 4.5 | 7.2 | 0.32 | 0.20 | 14.0 |
| 20 | 4 | 4 | — | 5.09 | 0.0469 | 4.5 | 7.2 | 0.32 | 0.50 | 8.0 |
| 21 | 4 | 4 | — | 5.09 | 0.0469 | 4.5 | 7.2 | 0.32 | 0.10 | 6.5 |
| 22 | 4 | 4 | — | 5.09 | 0.0469 | 4.5 | 7.2 | 0.32 | 0.02 | 7.3 |
| 23 | 4 | 4 | — | 5.09 | 0.0469 | 4.5 | 7.2 | 0.32 | 0.20 | 14.0 |
| 24 | 4 | 4 | — | 5.09 | 0.0469 | 4.5 | 7.2 | 0.32 | 0.10 | 16.0 |
| 25 | 4 | 4 | — | 5.09 | 0.0469 | 4.5 | 7.2 | 0.32 | 0.10 | 1.0 |
| 26 | 4 | 4 | — | 5.09 | 0.0469 | 4.5 | 7.2 | 0.32 | 2.00 | 8.0 |
| 27 | 5 | 5 | — | 5.09 | 0.0599 | 3.0 | 6.8 | 0.28 | 0.20 | 8.0 |
| 28 | 5 | 5 | — | 5.09 | 0.0599 | 3.0 | 6.8 | 0.28 | 0.20 | 10.0 |
| 29 | 5 | 5 | — | 5.09 | 0.0599 | 3.0 | 6.8 | 0.28 | 0.20 | 14.0 |
| 30 | 5 | 5 | — | 5.09 | 0.0599 | 3.0 | 6.8 | 0.28 | 0.20 | 2.5 |
| 31 | 6 | 6 | — | 5.06 | 0.0466 | 4.5 | 6.5 | 0.30 | 0.10 | 7.5 |
| 32 | 6 | 6 | — | 5.06 | 0.0466 | 4.5 | 6.5 | 0.30 | 0.10 | 9.0 |
| 33 | 6 | 6 | — | 5.06 | 0.0466 | 4.5 | 6.5 | 0.30 | 0.10 | 12.5 |
| 34 | 6 | 6 | — | 5.06 | 0.0466 | 4.5 | 6.5 | 0.30 | 0.10 | 2.5 |
| 35 | 7 | 7 | — | 5.02 | 0.0372 | 4.5 | 6.5 | 0.30 | 0.10 | 7.5 |
| 36 | 7 | 7 | — | 5.02 | 0.0372 | 4.5 | 6.5 | 0.30 | 0.10 | 9.0 |
| 37 | 7 | 7 | — | 5.02 | 0.0372 | 4.5 | 6.5 | 0.30 | 0.10 | 12.5 |
| 38 | 7 | 7 | — | 5.02 | 0.0372 | 4.5 | 6.5 | 0.30 | 0.10 | 2.5 |
| 39 | 8 | 8 | — | 6.07 | 0.0547 | 4.5 | 7.5 | 0.32 | 0.04 | 8.0 |
| 40 | 8 | 8 | — | 6.07 | 0.0547 | 4.5 | 7.5 | 0.32 | 0.20 | 9.0 |
| 41 | 8 | 8 | — | 6.07 | 0.0547 | 4.5 | 7.5 | 0.32 | 0.20 | 15.0 |
| 42 | 8 | 8 | — | 6.07 | 0.0547 | 4.5 | 7.5 | 0.32 | 0.50 | 8.0 |
| 43 | 8 | 8 | — | 6.07 | 0.0547 | 4.5 | 7.5 | 0.32 | 0.10 | 6.5 |
| 44 | 8 | 8 | — | 6.07 | 0.0547 | 4.5 | 7.5 | 0.32 | 0.02 | 7.3 |
| 45 | 8 | 8 | — | 6.07 | 0.0547 | 4.5 | 7.5 | 0.32 | 0.10 | 17.0 |
| 46 | 8 | 8 | — | 6.07 | 0.0547 | 4.5 | 7.5 | 0.32 | 0.10 | 1.0 |
| 47 | 8 | 8 | — | 6.07 | 0.0547 | 4.5 | 7.5 | 0.32 | 2.00 | 8.0 |
| 48 | 9 | 9 | — | 11.91 | 0.1345 | 4.5 | 7.0 | 0.30 | 0.10 | 7.5 |
| 49 | 9 | 9 | — | 11.91 | 0.1345 | 4.5 | 7.0 | 0.30 | 0.10 | 9.0 |
| 50 | 9 | 9 | — | 11.91 | 0.1345 | 4.5 | 7.0 | 0.30 | 0.10 | 12.5 |
| 51 | 9 | 9 | — | 11.91 | 0.1345 | 4.5 | 7.0 | 0.30 | 0.10 | 3.5 |
| 52 | 10 | 10 | — | 5.07 | 0.0637 | 6.5 | 6.8 | 0.28 | 0.20 | 8.0 |
| 53 | 11 | 11 | — | 5.08 | 0.0468 | 6.5 | 6.8 | 0.28 | 0.20 | 8.0 |
| 54 | 5 | 5 | 5 | 5.09 | 0.0599 | 6.5 | 6.8 | 0.28 | 0.20 | 8.0 |
| 55 | 5 | 5 | 5 | 5.09 | 0.0599 | 6.5 | 6.8 | 0.28 | 0.20 | 10.0 |
| 56 | 5 | 5 | 5 | 5.09 | 0.0599 | 6.5 | 6.8 | 0.28 | 0.20 | 14.0 |
| 57 | 5 | 5 | 5 | 5.09 | 0.0599 | 6.5 | 6.8 | 0.28 | 0.20 | 2.5 |
| 58 | 2 | 2 | — | 4.56 | 0.0406 | 4.0 | 7.0 | 0.28 | 0.10 | 7.1 |
| 59 | 2 | 2 | — | 4.56 | 0.0406 | 4.0 | 7.0 | 0.28 | 0.20 | 5.0 |
| 60 | 2 | 2 | — | 4.56 | 0.0406 | 4.0 | 7.0 | 0.28 | 0.20 | 8.5 |
| 61 | 12 | 12 | — | 8.57 | 0.1018 | 4.0 | 7.1 | 0.28 | 1.00 | 7.5 |
| 62 | 12 | 12 | — | 8.57 | 0.1018 | 4.0 | 6.5 | 0.28 | 1.00 | 14.2 |
| 63 | 13 | 13 | — | 9.87 | 0.1215 | 4.0 | 7.2 | 0.28 | 1.00 | 7.6 |
| 64 | 13 | 13 | — | 9.87 | 0.1215 | 4.0 | 7.7 | 0.28 | 0.30 | 7.7 |
| 65 | 1 | 13 | — | 9.87 | 0.1215 | 4.5 | 7.5 | 0.28 | 0.50 | 3.2 |
| 66 | 1 | 7 | — | 5.02 | 0.0372 | 4.5 | 7.0 | 0.28 | 0.80 | 3.0 |

TABLE 2-continued

| No. | Subsequent current passage Welding time Tp (s) | Ip/I | Minimum Ip/I | Maximum Ip/I | Appropriate control range of Ip/I | Conformance of formula at left | Evaluation result of cross tensile test | Remarks |
|---|---|---|---|---|---|---|---|---|
| 1 | 0.20 | 1.14 | 0.46 | 1.99 | Formula (2) | Good | Excellent | Example |
| 2 | 0.10 | 1.43 | 0.50 | 2.17 | Formula (2) | Good | Excellent | Example |
| 3 | 0.20 | 2.07 | 0.46 | 1.99 | Formula (2) | Poor | Poor | Comparative Example |
| 4 | 0.20 | 0.36 | 0.46 | 1.99 | Formula (2) | Poor | Poor | Comparative Example |
| 5 | 0.40 | 1.03 | 0.33 | 1.48 | Formula (2) | Good | Excellent | Example |
| 6 | 0.20 | 1.14 | 0.45 | 2.00 | Formula (2) | Good | Excellent | Example |
| 7 | 0.06 | 2.00 | 0.51 | 2.26 | Formula (2) | Good | Excellent | Example |
| 8 | 0.50 | 1.14 | 0.45 | 2.00 | Formula (2) | Good | Excellent | Example |
| 9 | 0.40 | 0.93 | 0.35 | 1.57 | Formula (2) | Good | Good | Example |
| 10 | 0.02 | 2.29 | 0.49 | 2.16 | Formula (2) | Poor | Poor | Comparative Example |
| 11 | 1.50 | 0.14 | 0.20 | 0.88 | Formula (2) | Poor | Poor | Comparative Example |
| 12 | 0.20 | 1.03 | 1.13 | 5.00 | Formula (2) | Poor | Poor | Comparative Example |
| 13 | 0.20 | 1.18 | 0.45 | 2.00 | Formula (1) | Good | Excellent | Example |
| 14 | 0.10 | 1.47 | 0.49 | 2.19 | Formula (1) | Good | Excellent | Example |
| 15 | 0.20 | 2.06 | 0.45 | 2.00 | Formula (1) | Poor | Poor | Comparative Example |
| 16 | 0.20 | 0.37 | 0.45 | 2.00 | Formula (1) | Poor | Poor | Comparative Example |
| 17 | 0.40 | 1.04 | 0.34 | 1.48 | Formula (2) | Good | Excellent | Example |
| 18 | 0.20 | 1.14 | 0.46 | 1.99 | Formula (2) | Good | Excellent | Example |
| 19 | 0.06 | 1.94 | 0.52 | 2.25 | Formula (2) | Good | Excellent | Example |
| 20 | 0.50 | 1.11 | 0.46 | 1.99 | Formula (2) | Good | Excellent | Example |
| 21 | 0.40 | 0.90 | 0.36 | 1.56 | Formula (2) | Good | Good | Example |
| 22 | 0.10 | 1.01 | 0.42 | 1.84 | Formula (2) | Good | Good | Example |
| 23 | 0.20 | 1.94 | 0.46 | 1.99 | Formula (2) | Good | Good | Example |
| 24 | 0.02 | 2.22 | 0.49 | 2.14 | Formula (2) | Poor | Poor | Comparative Example |
| 25 | 1.50 | 0.14 | 0.20 | 0.87 | Formula (2) | Poor | Poor | Comparative Example |
| 26 | 0.20 | 1.11 | 1.15 | 4.97 | Formula (2) | Poor | Poor | Comparative Example |
| 27 | 0.20 | 1.18 | 0.47 | 1.96 | Formula (2) | Good | Excellent | Example |
| 28 | 0.10 | 1.47 | 0.52 | 2.14 | Formula (2) | Good | Excellent | Example |
| 29 | 0.20 | 2.06 | 0.47 | 1.96 | Formula (2) | Poor | Poor | Comparative Example |
| 30 | 0.20 | 0.37 | 0.47 | 1.96 | Formula (2) | Poor | Poor | Comparative Example |
| 31 | 0.20 | 1.15 | 0.42 | 1.82 | Formula (2) | Good | Excellent | Example |
| 32 | 0.10 | 1.38 | 0.46 | 1.99 | Formula (2) | Good | Excellent | Example |
| 33 | 0.20 | 1.92 | 0.42 | 1.82 | Formula (2) | Poor | Poor | Comparative Example |
| 34 | 0.20 | 0.38 | 0.42 | 1.82 | Formula (2) | Poor | Poor | Comparative Example |
| 35 | 0.20 | 1.15 | 0.41 | 1.84 | Formula (1) | Good | Excellent | Example |
| 36 | 0.10 | 1.38 | 0.45 | 2.00 | Formula (1) | Good | Excellent | Example |
| 37 | 0.20 | 1.92 | 0.41 | 1.84 | Formula (1) | Poor | Poor | Comparative Example |
| 38 | 0.20 | 0.38 | 0.41 | 1.84 | Formula (1) | Poor | Poor | Comparative Example |
| 39 | 0.20 | 1.07 | 0.41 | 1.71 | Formula (2) | Good | Excellent | Example |
| 40 | 0.10 | 1.20 | 0.51 | 2.15 | Formula (2) | Good | Excellent | Example |
| 41 | 0.06 | 2.00 | 0.53 | 2.23 | Formula (2) | Good | Excellent | Example |
| 42 | 0.50 | 1.07 | 0.47 | 1.97 | Formula (2) | Good | Excellent | Example |
| 43 | 0.40 | 0.87 | 0.37 | 1.55 | Formula (2) | Good | Good | Example |
| 44 | 0.10 | 0.97 | 0.43 | 1.83 | Formula (2) | Good | Good | Example |
| 45 | 0.02 | 2.27 | 0.50 | 2.13 | Formula (2) | Poor | Poor | Comparative Example |
| 46 | 1.50 | 0.13 | 0.21 | 0.87 | Formula (2) | Poor | Poor | Comparative Example |
| 47 | 0.20 | 1.07 | 1.17 | 4.93 | Formula (2) | Poor | Poor | Comparative Example |
| 48 | 0.20 | 1.07 | 0.52 | 1.62 | Formula (3) | Good | Excellent | Example |
| 49 | 0.10 | 1.29 | 0.57 | 1.77 | Formula (3) | Good | Excellent | Example |
| 50 | 0.20 | 1.79 | 0.52 | 1.62 | Formula (3) | Poor | Poor | Comparative Example |
| 51 | 0.20 | 0.50 | 0.52 | 1.62 | Formula (3) | Poor | Poor | Comparative Example |

TABLE 2-continued

| | | | | | | | | |
|---|---|---|---|---|---|---|---|---|
| 52 | 0.20 | 1.18 | 0.48 | 1.95 | Formula (2) | Good | Poor | Comparative Example |
| 53 | 0.20 | 1.18 | 0.46 | 1.99 | Formula (2) | Good | Poor | Comparative Example |
| 54 | 0.20 | 1.18 | 0.47 | 1.96 | Formula (2) | Good | Excellent | Example |
| 55 | 0.10 | 1.47 | 0.52 | 2.14 | Formula (2) | Good | Excellent | Example |
| 56 | 0.20 | 2.06 | 0.47 | 1.96 | Formula (2) | Poor | Poor | Comparative Example |
| 57 | 0.20 | 0.37 | 0.47 | 1.96 | Formula (2) | Poor | Poor | Comparative Example |
| 58 | 1.20 | 1.01 | 0.23 | 1.00 | Formula (2) | Poor | Poor | Comparative Example |
| 59 | 0.20 | 0.71 | 0.45 | 2.00 | Formula (2) | Good | Good | Example |
| 60 | 0.40 | 1.21 | 0.39 | 1.71 | Formula (2) | Good | Good | Example |
| 61 | 0.20 | 1.06 | 0.88 | 3.11 | Formula (3) | Good | Good | Example |
| 62 | 1.30 | 2.18 | 0.46 | 1.62 | Formula (3) | Poor | Poor | Comparative Example |
| 63 | 0.20 | 1.06 | 0.92 | 3.01 | Formula (3) | Good | Good | Example |
| 64 | 2.00 | 1.00 | 0.24 | 0.78 | Formula (3) | Poor | Poor | Comparative Example |
| 65 | 1.00 | 0.43 | 0.41 | 1.35 | Formula (3) | Good | Good | Example |
| 66 | 0.90 | 0.43 | 0.42 | 1.90 | Formula (1) | Good | Good | Example |

In all Examples, the fracture form was plug failure. In all Examples, the nugget diameter was sufficient, and no expulsion occurred. In all Comparative Examples, on the other hand, the fracture form was partial plug failure or plug failure (interface failure), and favorable fracture form was not obtained.

REFERENCE SIGNS LIST

1, 2 steel sheet
3 sheet combination (parts to be welded)
4, 5 electrode
6 nugget

The invention claimed is:

1. A resistance spot welding method of joining parts to be welded that are two or more overlapping steel sheets,
wherein a steel sheet whose Mn content is highest of the overlapping steel sheets has a chemical composition that satisfies
0.050% ≤ C ≤ 0.250%,
3.50% ≤ MN ≤ 12.00%,
0.001% ≤ Si ≤ 2.000%,
0.001% ≤ P ≤ 0.025%, and
0.0001% ≤ S ≤ 0.0020%,
the resistance spot welding method comprises
performing main current passage and subsequent current passage, with a cooling time of 0.01 s or more being provided between the main current passage and the subsequent current passage, and
Ip/I which is a ratio of a current value of the subsequent current passage to a current value of the main current passage satisfies, depending on a constant A defined by the Mn content and P content in the chemical composition, any of the following Formulas (1) to (3) in relation to Tp, T, and the constant A:

when $A \leq 0.04$, $$(0.41+A) \times (1+T)/(1+Tp) \leq Ip/I \leq (2.04-A) \times (1+T)/(1+Tp) \quad (1);$$

when $0.04 < A \leq 0.09$, $$(0.402+1.2 \times A) \times (1+T)/(1+Tp) \leq Ip/I \leq (2.08-2 \times A) \times (1+T)/(1+Tp) \quad (2); \text{ and}$$

when $0.09 < A \leq 0.155$, $$(0.393+1.3 \times A) \times (1+T)/(1+Tp) \leq Ip/I \leq (2.17-3 \times A) \times (1+T)/(1+Tp) \quad (3),$$

where I denotes the current value of the main current passage expressed in kA, Ip denotes the current value of the subsequent current passage expressed in kA, Tp denotes a welding time of the subsequent current passage expressed in s, T denotes the cooling time expressed in s, and the constant A is defined by any of the following Formulas (4) to (6) depending on the Mn content:

when $3.5\% \leq Mn \leq 4.5\%$, $$A = (Mn+1.5)/200+P \quad (4);$$

when $4.5\% < Mn \leq 7.5\%$, $$A = (Mn-1.5)/100+P \quad (5); \text{ and}$$

when $7.5\% < Mn \leq 12.0\%$, $$A = (Mn-3.9)/60+P \quad (6)$$

where Mn and P are respectively the Mn content and the P content in the chemical composition.

* * * * *